(12) United States Patent
Cregut et al.

(10) Patent No.: US 9,410,473 B2
(45) Date of Patent: Aug. 9, 2016

(54) MOTOR VEHICLE COOLING DEVICE

(75) Inventors: Samuel Cregut, Saint-Remy-les-Chevreuse (FR); Marco Marsilia, Boulogne Billancourt (FR)

(73) Assignee: RENAULT S.A.S., Boulogne Billancourt (FR)

( * ) Notice: Subject to any disclaimer, the term of this patent is extended or adjusted under 35 U.S.C. 154(b) by 1064 days.

(21) Appl. No.: 13/518,208

(22) PCT Filed: Oct. 14, 2010

(86) PCT No.: PCT/FR2010/052177
§ 371 (c)(1),
(2), (4) Date: Sep. 28, 2012

(87) PCT Pub. No.: WO2011/077020
PCT Pub. Date: Jun. 30, 2011

(65) Prior Publication Data
US 2013/0056194 A1 Mar. 7, 2013

(30) Foreign Application Priority Data
Dec. 22, 2009 (FR) ...................................... 09 59398

(51) Int. Cl.
| F01P 3/00 | (2006.01) |
| F01P 7/16 | (2006.01) |
| B60K 11/02 | (2006.01) |
| B60K 1/00 | (2006.01) |
| F01P 5/10 | (2006.01) |

(52) U.S. Cl.
CPC ................. F01P 7/164 (2013.01); B60K 11/02 (2013.01); B60K 2001/003 (2013.01); B60K 2001/006 (2013.01); F01P 2005/105 (2013.01)

(58) Field of Classification Search
CPC ................. F01P 3/00; F01P 7/00; F01P 7/14; F01P 7/164; F01P 7/167; B60K 11/02
See application file for complete search history.

(56) References Cited

U.S. PATENT DOCUMENTS

| 5,390,632 | A | * | 2/1995 | Ikebe | ...................... | F01P 7/164 |
| | | | | | | 123/41.02 |
| 5,529,114 | A | | 6/1996 | Hall et al. | | |
| 5,678,760 | A | | 10/1997 | Muso et al. | | |
| 6,607,142 | B1 | | 8/2003 | Boggs et al. | | |
| 6,705,254 | B1 | | 3/2004 | Grabowski et al. | | |
| 2009/0139686 | A1 | | 6/2009 | Suzuki | | |
| 2010/0170455 | A1 | * | 7/2010 | Feldhaus | ................... | F01P 3/20 |
| | | | | | | 123/41.08 |

OTHER PUBLICATIONS

International Search Report Issued Feb. 8, 2011 in PCT/FR10/52177 Filed Oct. 14, 2010.

\* cited by examiner

*Primary Examiner* — Lindsay Low
*Assistant Examiner* — Jacob Amick
(74) *Attorney, Agent, or Firm* — Oblon, McClelland, Maier & Neustadt, L.L.P.

(57) ABSTRACT

A cooling device for a motor vehicle, including a cooling circuit configured to cool an engine assembly using a liquid coolant circulated by at least one variable delivery pump, the delivery output by each pump being controlled by a control system. The control system is configured to regulate the delivery of each pump so that the temperature of the liquid coolant does not exceed a fixed datum temperature.

11 Claims, 10 Drawing Sheets

MOTOR VEHICLE COOLING DEVICE

BACKGROUND

The subject of the invention is a cooling device for a motor vehicle, comprising a cooling circuit capable of cooling an engine unit using a liquid coolant circulated by at least one variable flow rate pump. The invention applies advantageously to electric motor vehicles.

In an internal combustion engine, the repeated combustions overheat the contact parts, such as the pistons, cylinders and valves, and are diffused throughout the mechanical parts of the engine. Consequently, these parts need to be cooled to prevent damage. To work properly, combustion engines therefore require a suitable, constant temperature.

In electric-drive vehicles, it is also necessary to cool the various elements of the power train.

It is known to use a cooling system comprising one or more pumps to circulate a liquid coolant around the engine, as well as a radiator, which is a heat exchanger used to cool the liquid. In this case, the flow rate of the liquid coolant depends on the engine speed and is in particular zero when the engine is stopped.

BRIEF SUMMARY

It would be desirable to have a cooling device that optimized operation of the pumps and in particular limited the wear and energy consumption thereof.

The device according to the invention enables this objective to be achieved.

The subject of the invention is therefore a cooling device for a motor vehicle, comprising a cooling circuit capable of cooling an engine unit using a liquid coolant circulated by at least one variable flow rate pump, the flow rate of each pump being commanded by a command system.

In the device according to the invention, the command system is capable of adjusting the flow rate of each pump so that the temperature of the liquid coolant does not exceed a fixed set point temperature.

The command system may be capable of adjusting the flow rate of each pump at all times so that the temperature of the liquid coolant does not exceed the fixed set point temperature.

The command system is advantageously able to establish a flow rate set point as a function of a variable set point temperature.

The variable set point temperature is for example a function of the fixed set point temperature, the temperature of the liquid coolant and a temperature of the liquid coolant estimated as a function of the flow rate set point.

The variable set point temperature may be equal to the difference between the temperature of the liquid coolant and the estimated temperature, subtracted from the fixed set point temperature.

The motor vehicle may be an electric vehicle and the engine unit may include an electronic piloting system.

The electric vehicle may include a battery charger unit and the cooling circuit is advantageously able to cool the charger unit and the engine unit.

The command system is preferably able to establish the flow rate set point as a function of the variable set point temperature, the temperature outside the vehicle, the speed of the vehicle, the thermal losses of the electronic piloting system and the thermal losses of the battery charger.

The command system is preferably able to establish the estimated set point temperature as a function of the flow rate set point, the temperature outside the vehicle, the speed of the vehicle, the thermal losses of the electronic piloting system and the thermal losses of the battery charger.

The device may include a first pump able to supply liquid coolant selectively to the engine unit and a second pump able to supply liquid coolant selectively to the charger unit.

The device may include a first valve able to stop liquid coolant from entering the charger unit and a second valve able to stop liquid coolant from entering the engine unit.

The device may include a hydraulic restriction enabling a minimum flow rate of liquid coolant to be maintained in the engine unit.

BRIEF DESCRIPTION OF THE DRAWINGS

Other characteristics and advantages of the present invention are set out in greater detail in the description below, given by way of non-limiting example and in reference to the attached drawings, in which.

DETAILED DESCRIPTION

Figure 1:
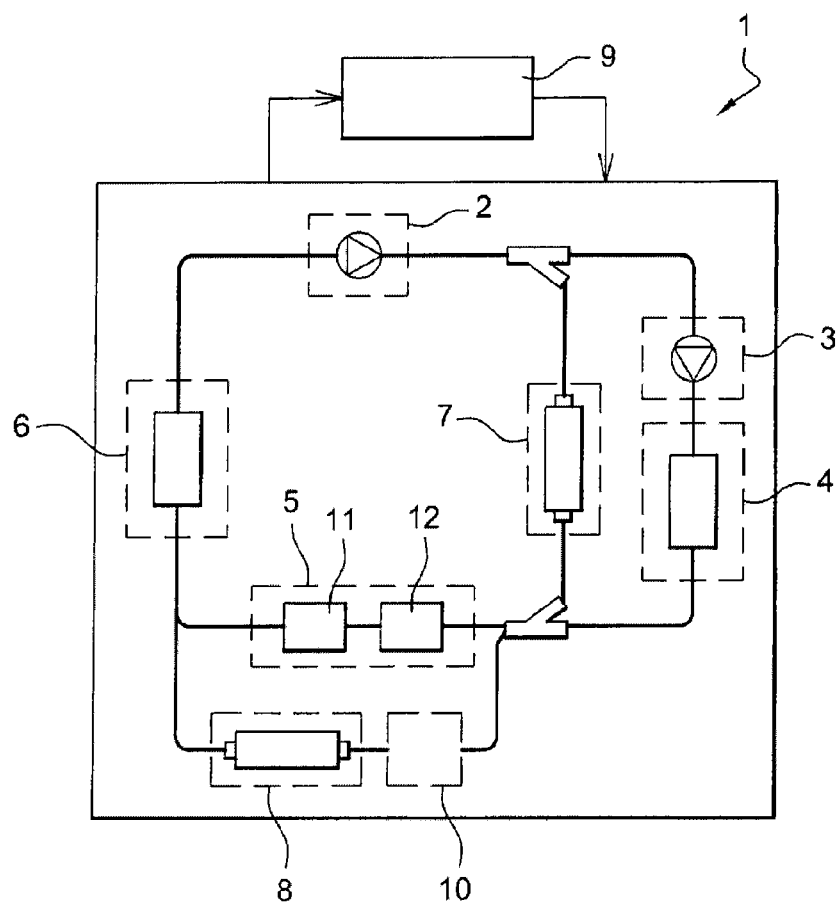
FIG. 1 is a block diagram of a cooling device according to the invention, built into an electric vehicle.

The cooling device 1, as shown in FIG. 1, includes a first electric pump 2, a second electric pump 3, a battery charger 4, an engine unit 5, and a radiator 6, as well as a first solenoid valve 7 and a second solenoid valve 8. The first electric pump 2, the second electric pump 3, the first solenoid valve 7 and the second solenoid valve 8 are connected to a command device 9.

The first electric pump 2 is designed to be used when the vehicle is moving, while the second electric pump 3 is designed to be used when recharging the battery. The flow rate of the first pump 2 and the flow rate of the second pump 3 may be adjusted using a command signal.

When the vehicle is stationary, the charger 4 enables the electric drive battery, not shown, to be recharged from the domestic electricity network.

The first solenoid valve 7 enables the second pump 3 and the charger 4 to be short-circuited when the vehicle is moving, while the second solenoid valve 8 enables the engine unit 5 to be short-circuited when charging the battery, if cooling of the engine unit 5 is not deemed to be necessary. The second solenoid valve 8 may be connected to a hydraulic restriction 10 that enables a pressure drop to be effected, thereby maintaining a flow rate of liquid coolant in the engine unit 5, even if the second solenoid valve 8 is open.

The engine unit 5 includes an engine 11 and an electronic piloting system 12 designed in particular to transform the DC voltage from the battery into AC voltage.

The radiator 6 makes it possible to cool the liquid coolant, similarly to the cooling device of an internal combustion engine. It is fitted with an electric fan, not shown.

It is necessary to cool the engine unit 5 when the vehicle is moving, and the charger 4 when the vehicle is stationary. The cooling strategy is managed by the command device 9. The command device 9 is a processor connected to sensors in the cooling circuit, in particular liquid coolant temperature sensors. The processor 9 pilots the pumps 2, 3, the solenoid valves 7, 8, and the electric fan unit of the radiator 6. The processor 9 is also advantageously connected to other processors in the vehicle, for example via a controller area network (CAN) bus, in order to obtain other measurements required for the cooling strategy. The processor 9 hosts the strategy for preparing the liquid coolant flow rate command.

A possible solution is to slave the flow rate of each pump 2, 3 in an adjustment system in a closed loop including a proportional-integral (PI) corrector.

The PI corrector does not react, i.e. it does not change the flow rate, unless the output temperature of the water exceeds the set point temperature. The cooling system is a system with a potentially significant overall inertia: the calories in the electrotechnical system are generated in the metal masses of the electronic piloting system and it may take time before they are evacuated to the water. Consequently, a PI corrector may react too late if it waits for variations in the temperature of the cooling water.

Figure 2:
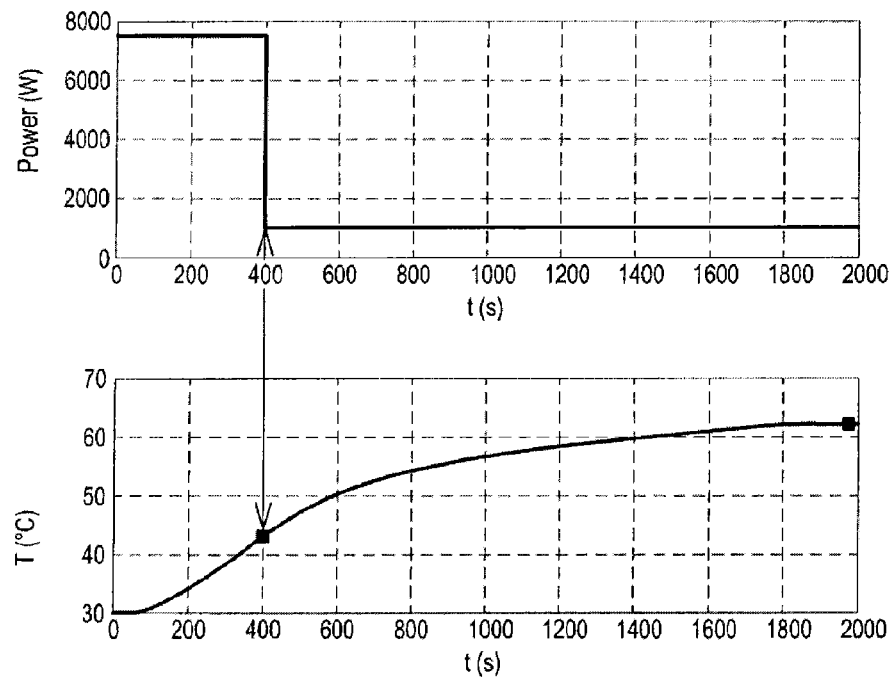
FIGS. 2 to 16 are diagrams used to explain the invention.
Figure 3:
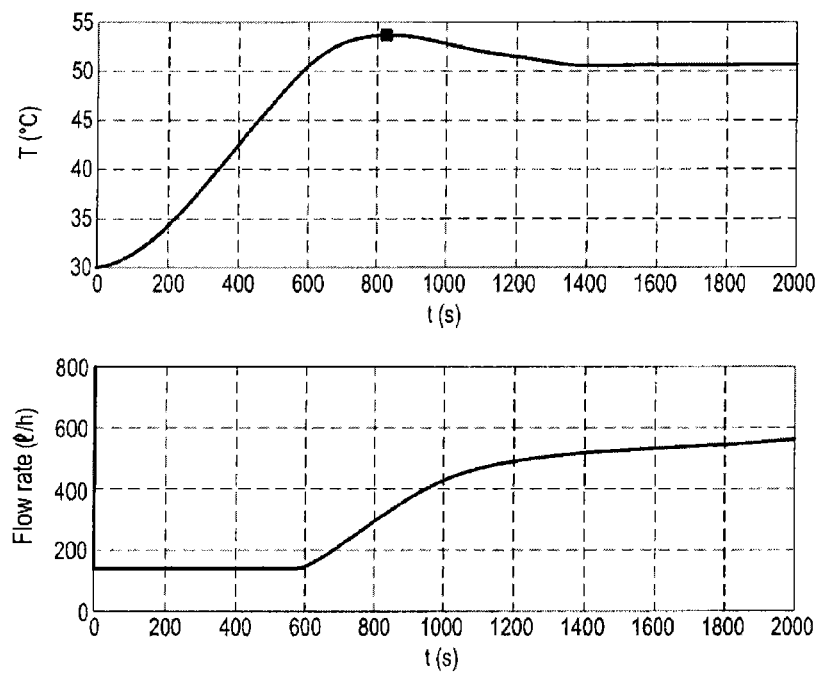

FIGS. 2 and 3 illustrate the problem posed through a cooling test. The conditions of this test are as follows.

The loss power to be dissipated from the electrotechnical system is stepped up to 7.5 kW for 400 s, before being dropped to a stabilized 1.5 kW.

Arbitrarily, vehicle speed is set to 30 km/h, external temperature to 30° C., and constant water flow rate to 150 l/h.

The first test, shown in FIG. 2, is performed with an open loop, with no corrector, the water flow rate being constant.

The upper part of the figure shows the losses from the electronic piloting system to be cooled, and the lower part shows the response of the water temperature over time. It can be seen that at t=400 s, the temperature of the water is only 42.8° C., and that it will reach more than 60° C., but not for 33 minutes.

The second test, as shown in FIG. 3, is performed under the same conditions, but this time, the PI corrector is activated: this is what will modify the flow rate. It can be seen that the PI corrector only reacts when the temperature of the water exceeds the 50° C. set point, which is too late.

Figure 4:
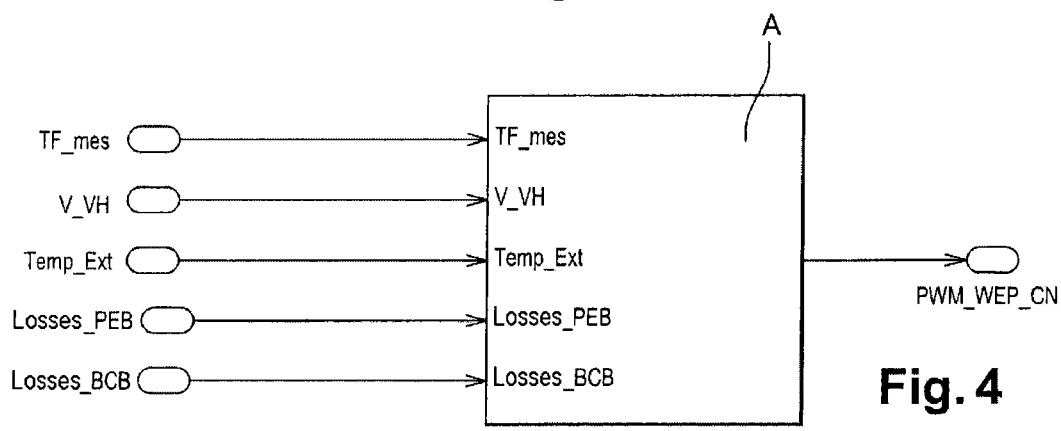

To remedy this, the inputs and the output of a command strategy block A according to the invention are shown in FIG. 4.

The inputs of block A are as follows:

TF_mes: Temperature of the liquid coolant, which can be obtained by a single sensor or obtained by merging several sources (for example: the electric engine or the electronic piloting system may themselves be fitted with water temperature sensors), V_VH: Vehicle speed, usually calculated by the ABS processor and available on the vehicle CAN, Temp_Ext: External temperature obtained from the vehicle CAN, Losses_PEB: Signal generated by the electronic piloting system representing an estimate of the losses generated in the electronic piloting system and the electric machine. Indeed, the electronic piloting system at all times knows the currents in the engine phases, and it also has a temperature sensor (and often several) and is therefore able to provide a reasonably precise estimate of the losses from the unit {electronic piloting system, engine}, Losses_BCB: Signal generated by the battery charger representing an estimate of the losses generated in the battery charger. Indeed, the battery charger at all times knows the charging current, and it also has a temperature sensor (and often several) and is therefore able to provide a reasonably precise estimate of the losses from the battery charger.

The output from block A is:

PWM_WEP_CN: Flow rate command for the electrotechnical system comprising the electronic piloting system, the battery charger and the electric drive motor. It is a signal between 0 and 100 expressing a percentage of the maximum flow rate deliverable by the pump.

Depending on the operating method, either the first pump or the second pump will be commanded by this signal.

The objective is to automatically adjust the flow rate command between a minimum value and a maximum value as a function of the temperature of the cooling circuit.

The principle is as follows: a maximum desired set point temperature is selected and then, using an explicit internal model and closed-loop control, a flow rate is determined to obtain this set point temperature. The looped signal is the difference between the temperature measurement of the liquid coolant and the temperature produced by this explicit internal model.

Figure 5:
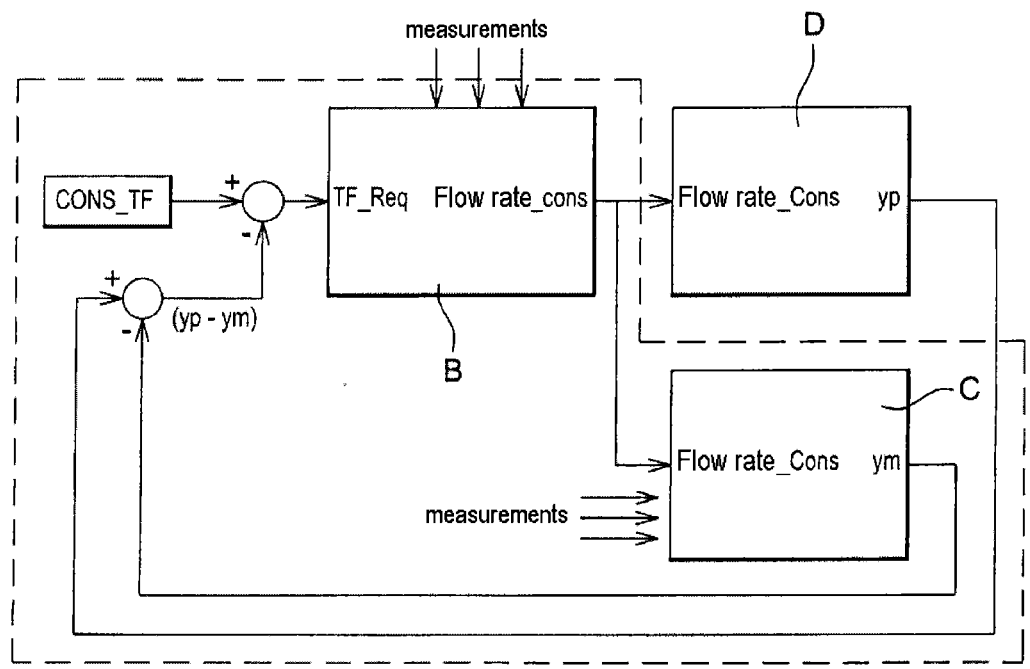

FIG. 5 shows the operating principle of this approach.

The control device is made up of two blocks:

Block B, known as the corrector block, receives an input of a water temperature TF_Req to be reached. Using different measurements (such as outside temperature, powers to be dissipated, and vehicle speed), block B is used to determine the flow rate required to achieve this target water temperature TF_Req in steady-state, Block C, known as the model block, receives as an input the set point flow rate calculated by block B and generates in real-time a water temperature ym on the basis of a dynamical model of the system.

The set point flow rate is also sent to a block D corresponding to the real system, and a water temperature yp may be measured.

The principle is that the target water temperature TF_Req is not always equal to the set point CONS_TF, it is corrected once the actual temperature differs from the temperature estimated by the internal model.

The remainder of the description contains details on obtaining blocks B and C.

Firstly, a fine model of the cooling system is prepared using a finite element model. Secondly, a simplified model based on physical equations is produced.

Figure 6:
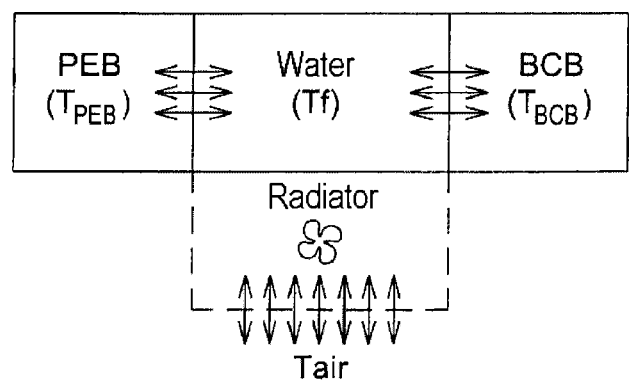

FIG. 6 illustrates the principle used. The simplifying hypotheses used are as follows:

Conveyance conditions disregarded: all of the water in the cooling circuit is treated as an immobile mass of water, The members (electronic piloting system PEB, electric drive motor and battery charger BEB) are treated as metal masses. The heat (losses from the electrotechnical system) is generated in these metal masses, then flows into the mass of water, The heat flows then flow through the radiator. The exchange characteristics of the radiator are provided by the manufacturers.

The dynamical equations are as follows:

$$M_{PEB} C_{PEB} \frac{dT_{PEB}}{dt} = P_{PEB} - hiS_{PEB}(T_{PEB} - T_f) \qquad (eq\ 1)$$

$$M_{BCB} C_{BCB} \frac{dT_{BCB}}{dt} = P_{BCB} - hiS_{BCB}(T_{BCB} - T_f) \qquad (eq\ 2)$$

$$M_f C_f \frac{dT_f}{dt} = hiS_{PEB}(T_{PEB} - T_f) + hiS_{BCB}(T_{BCB} - T_f) - \varphi_{radiator} \qquad (eq\ 3)$$

In which:

$M_{PEB}$=Metal mass equivalent to the unit {electronic piloting system+engine}, $C_{PEB}$=Specific heat capacity of the unit {electronic piloting system+engine}, $T_{PEB}$=Average temperature of the unit {electronic piloting system+engine}, $hiS_{PEB}$=Exchange ratio between the water and the unit {electronic piloting system+engine}, $M_{BCB}$=Equivalent metal mass of the battery charger, $C_{BCB}$=Specific heat capacity of the battery charger, $T_{BCB}$=Average temperature of the battery charger, $hiS_{BCB}$=Exchange ratio between the water and the battery charger, $M_f$=Fluid mass, $C_f$=Specific heat capacity of the fluid, $T_f$=Water temperature, $\varphi_{radiator}$=Heat flow evacuated by the radiator, given using a map, The power evacuated by the radiator depends on three magnitudes:

φradiator=f (Flow rate, Tair, Tf, V_AIR)

The flow rate passing through the radiator (Flow rate),
The temperature of the fluid (Tf) and,
The speed of the air passing through the radiator (V_AIR).
The radiator manufacturers supply the power evacuated by the radiator in the form of a two-dimensional map:
The two inputs for the map are:
Flow rate in l/h,
Air speed in m/s.
The power evacuated by the radiator is given for a fixed water/air temperature difference ATref (for example: ATref=10°).

The following applies to any water/air temperature difference:

$$\text{Power\_radiator} = \frac{(Twater - Tair)}{10} \cdot \text{Power\_radiator\_DTref}$$

This therefore gives a non-linear transfer as a function of flow rate and air speed.

Air speed is the sum of two sources:
Air speed attributable to vehicle speed. This is a fraction of vehicle speed, and
Additional wind speed provided by the electric fan unit of the radiator. This air flow is dependent on vehicle speed.

To obtain the corrector block B, the objective is to obtain the static gain of the flow rate to water temperature transfer in the radiator, i.e. the required flow rate must be determined for a given power to be evacuated.

This problem can be resolved through linearization of the maps of the power of the radiator as a function of flow rate. It can be seen that the mapping can be approximated by an equation of the form:

$$\text{Prad\_lin} = \lambda 1 \cdot \left(\frac{Vair}{Vair\_ref}\right) \text{Flow rate}\left(\frac{\Delta T}{\Delta Tref}\right) \quad (eq\ 4)$$

Prad_lin represents the power evacuated approximated by a law proportional to flow rate, air speed and ATref.

Vair_ref is set arbitrarily at 90 km/h (air speed equivalent to this vehicle speed).
ATref=10° C. is retained.
λ1 is calculated for example for the flow rate point=800 l/h, giving a power of 26210 W, so λ1=26210/800 W/(l/h).
The flow rate is therefore written as follows:

$$\text{Flow rate} = \frac{Pradiator}{\lambda 1 \cdot \left(\frac{Vair}{Vair\_ref}\right) \cdot \left(\frac{\Delta T}{\Delta Tref}\right)} \text{ of the form: Flow rate} = \frac{Pradiator}{\lambda R} \quad (eq\ 5)$$

Figure 7:
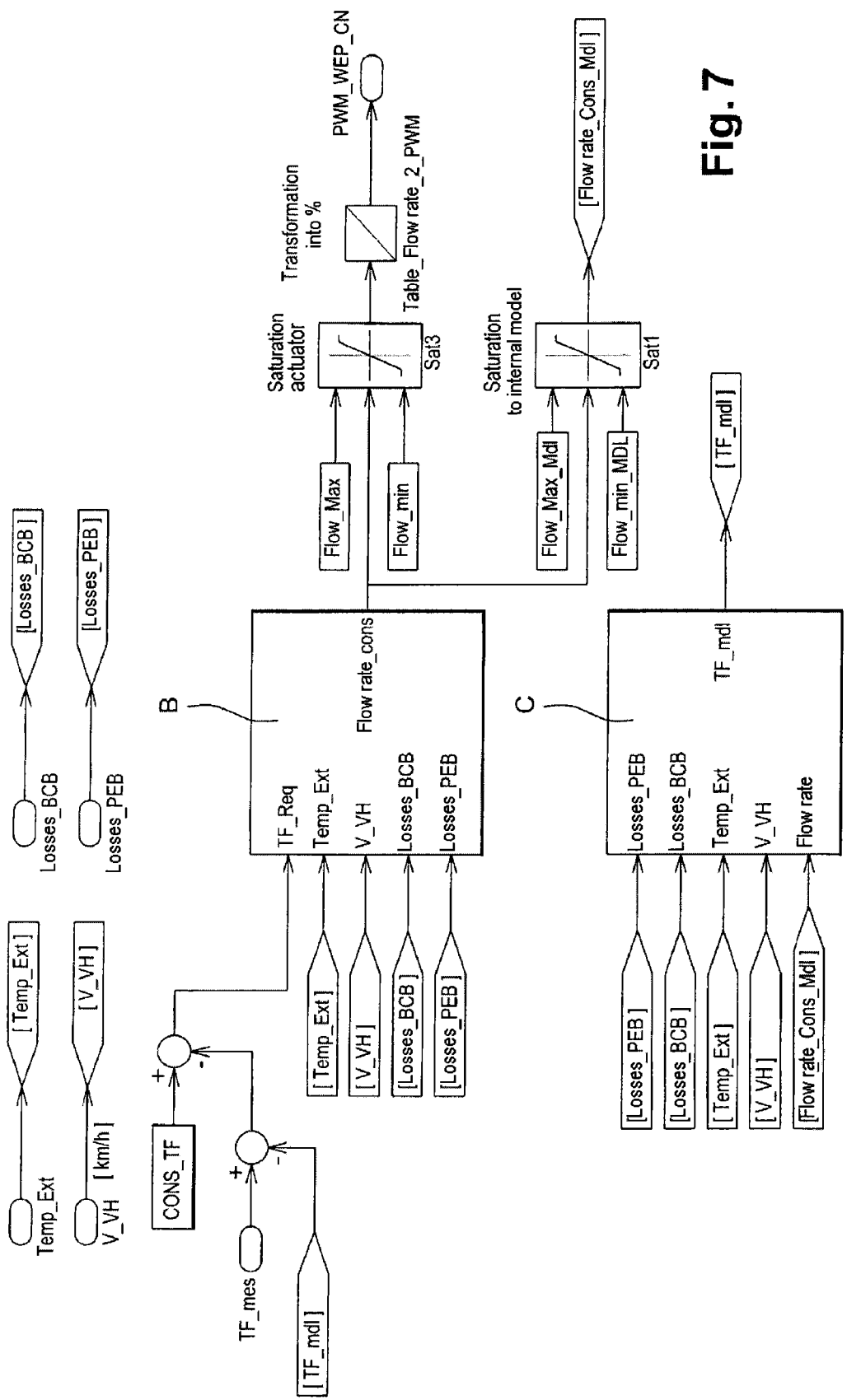

The embodiment of the control module A shown in FIG. 2 is shown in detail in FIG. 7. The inputs are described above.

The command Flow rate cons generated by the corrector block B is saturated between [Flow_Max] and [Flow_Min] which are the flow rate ranges supported by the pump. The command PWM is calculated using a simple table and provides the control output.

This command is also saturated between [Flow_Max] and [Flow_Min] before being re-injected into the dynamical model. These two parameters constitute the two adjustment parameters of the invention. The third parameter is "CONS_TF", which is the maximum desired set point temperature.

Figure 8:
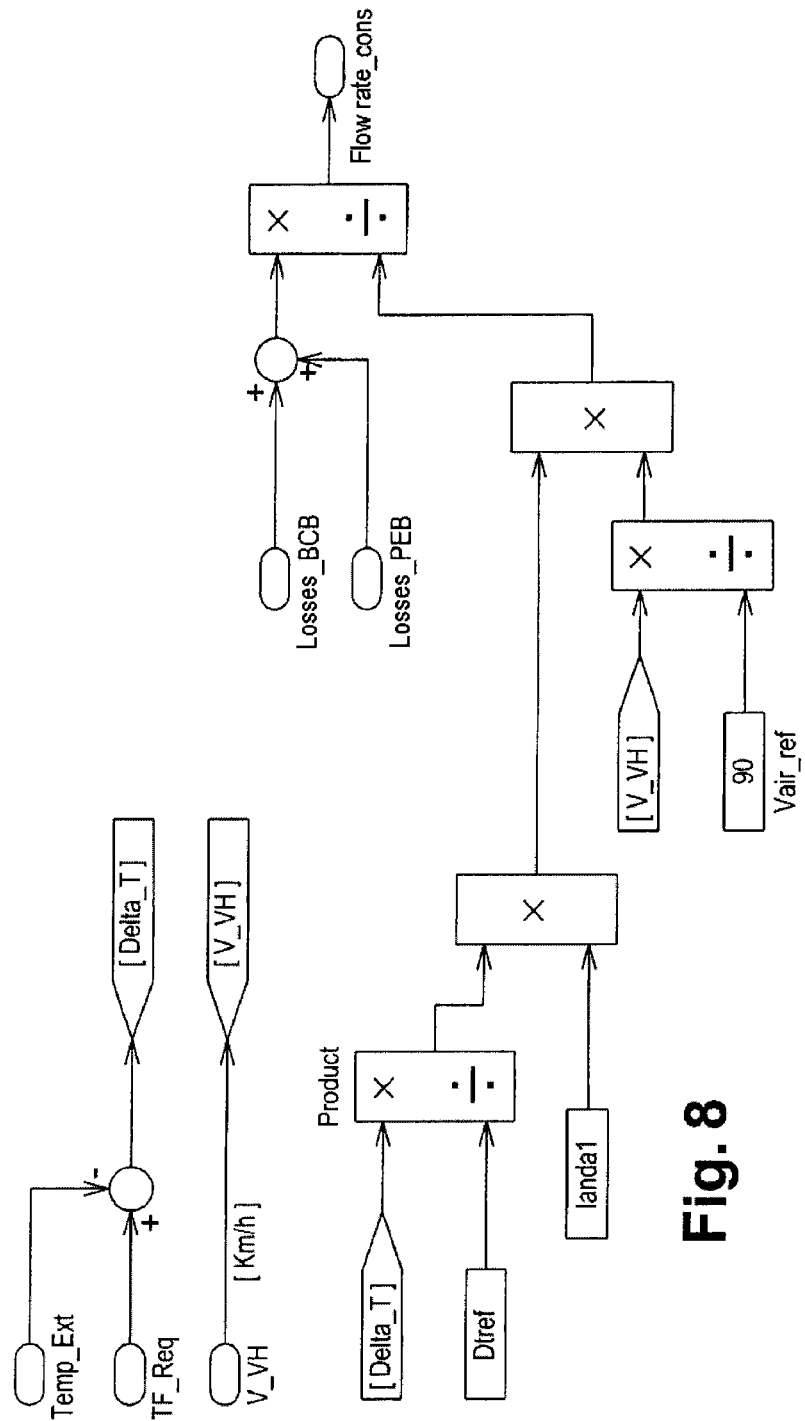

FIG. 8 shows a possible embodiment of block B. It is the embodiment of the equation (eq 5).

Figure 9:
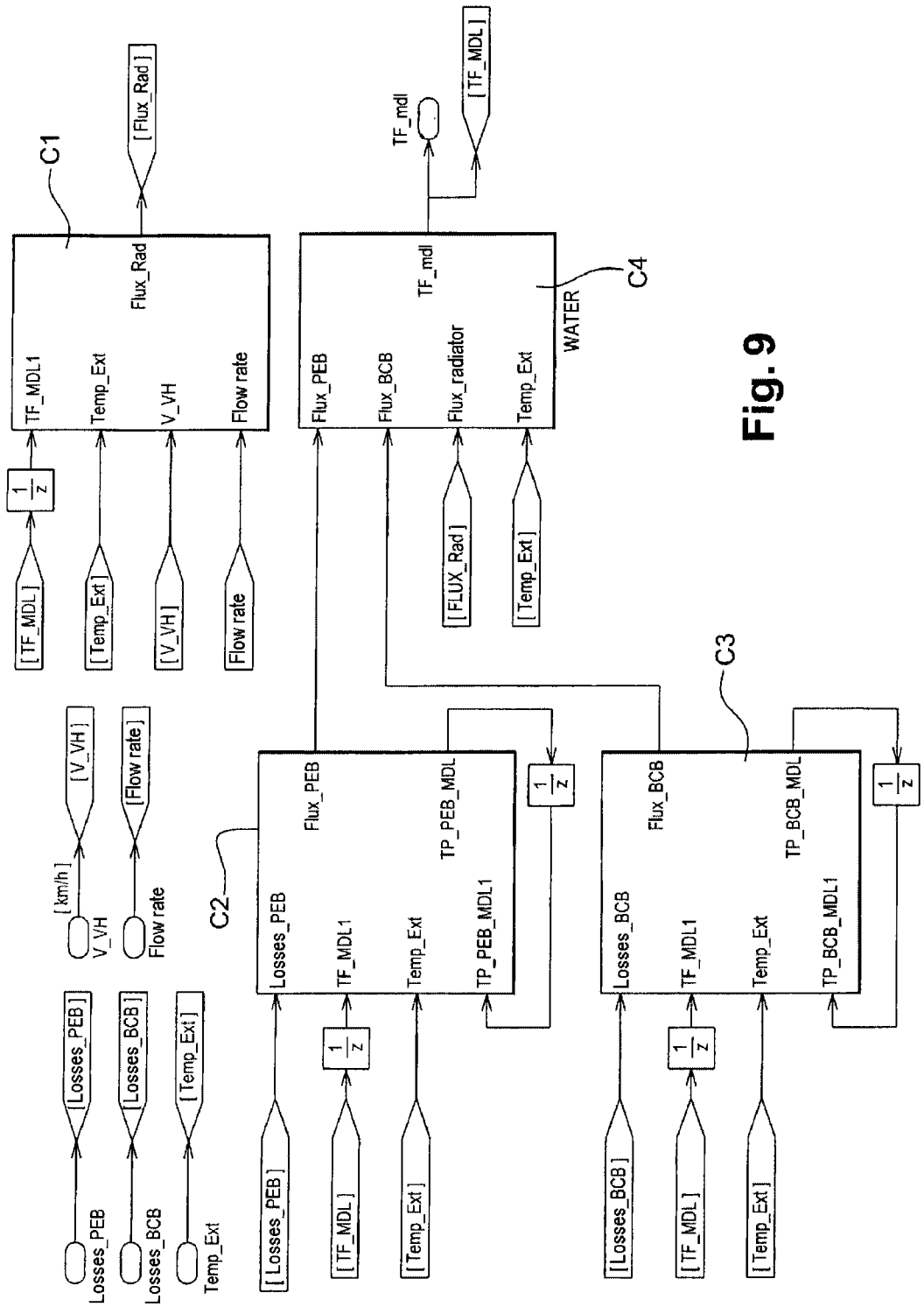

FIG. 9 shows a possible embodiment of block C. Block C includes numerical integrations. It is realized at each sampling period, which is typically around 1 second.

As can be seen, the model is broken down into four blocks C1 to C4, the operations of which are performed successively in the following order:
Block C1 ('Flux_radiator_linear'),
Block C2 ('PEB_ME'),
Block C3 ('BCB'),
Block C4 ('WATER').

Figure 10:
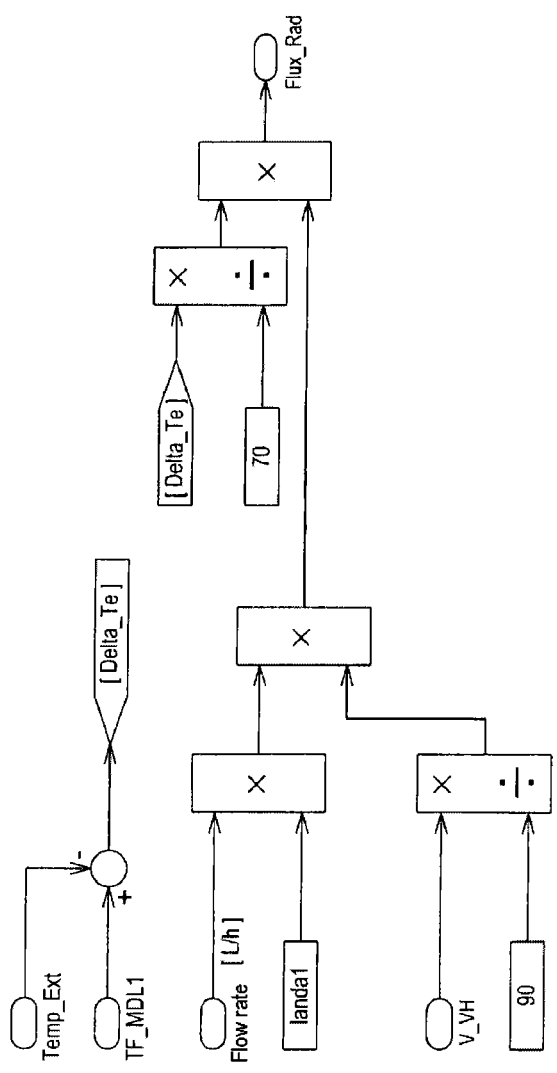

Block C1 ('Flux_radiator_linear') is used to calculate the power evacuated by the radiator to the outside air. A possible embodiment of this block is shown in FIG. 10.

The inputs of block C1 are as follows:
TF_MDL1: Water temperature calculated by the model at the previous sampling instant,
Temp_Ext: Air temperature outside the vehicle, measured by the passenger compartment processor,
V_VH: Vehicle speed,
Flow rate: Flow rate measurement.

The output from the block C1 is Flux_Rad, the flow of the radiator. Block C1 is the embodiment of the equation (eq 4).

Figure 11:
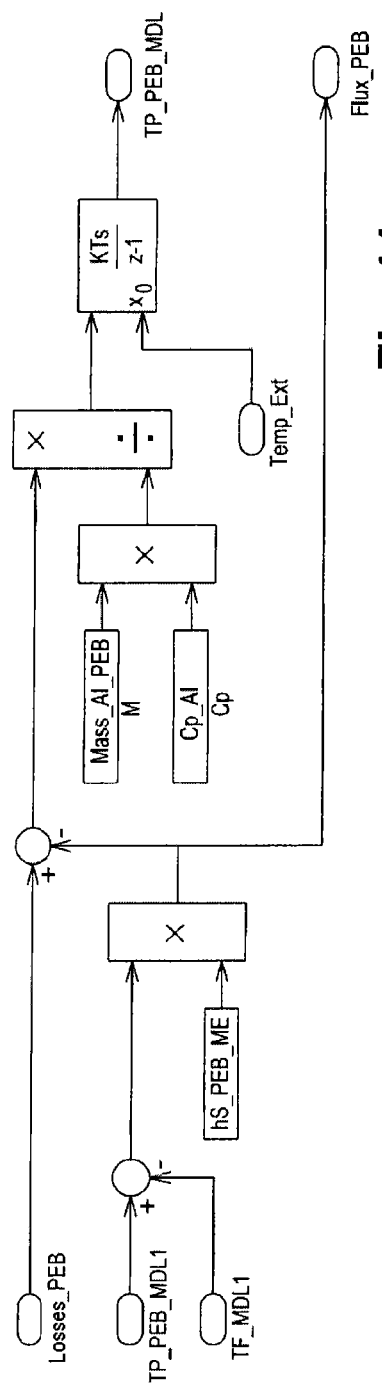

Block C2 is used to calculate the power exchanged between the unit {electronic piloting system+engine} to the water, as well as the temperature of the unit {electronic piloting system+engine}. A possible embodiment of this block is shown in FIG. 11.

The inputs of block C2 are as follows:
Losses_PEB: Losses dissipated by the unit {electronic piloting system+engine},
TF_MDL1: Water temperature calculated by the model at the previous sampling instant,
Temp_Ext: Air temperature outside the vehicle, measured by the passenger compartment processor,
TP_PEB_MDL 1: Temperature of the unit {electronic piloting system+engine} calculated by the block "PEB_ME" at the previous sampling instant.

The outputs from block C2 are as follows:
Flux_PEB: Flow exchanged between the unit {electronic piloting system+engine} and the water,
TP_PEB_MDL 1: Temperature of the unit {electronic piloting system+engine}.

Block C2 is the embodiment of the equation (eq 1).

Figure 12:
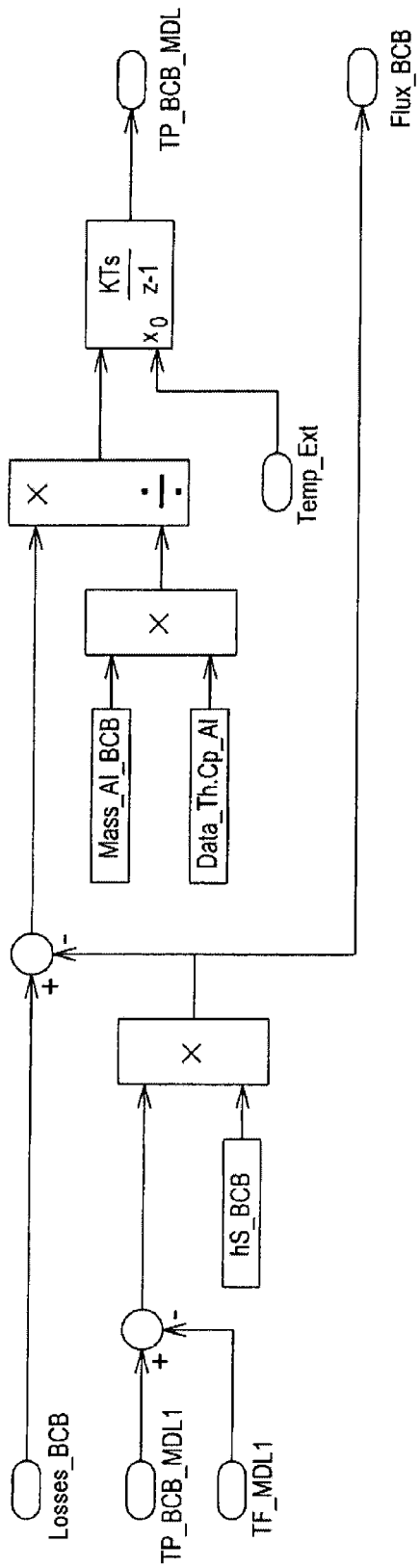

Block C3 is used to calculate the power exchanged between the battery charger and the water, as well as the temperature of the battery charger. A possible embodiment of this block is shown in FIG. 12.

The inputs of block C3 are as follows:
Losses_BCB: Losses dissipated by the battery charger,
TF_MDL1: Water temperature calculated by the model at the previous sampling instant,
Temp_Ext: Air temperature outside the vehicle, measured by the passenger compartment processor,
TP_BCB_MDL1: Temperature of the battery charger calculated by the block "BCB" at the previous sampling instant.

The outputs from block C3 are as follows:
Flux_BCB: Flow exchanged between the battery charger and the water,
TP_BCB_MDL: Temperature of the battery charger. Block C3 is the embodiment of the equation (eq 2).

Figure 13:
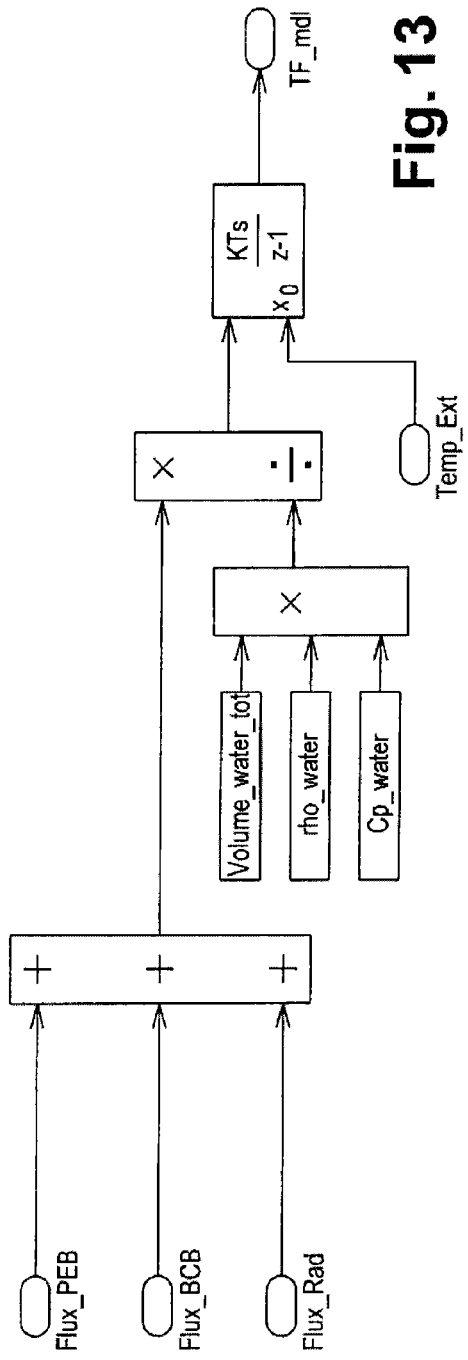

Block C4 is used to calculate the temperature of the water. A possible embodiment of this block is shown in FIG. 13.

The inputs of block C4 are as follows:
Flux_PEB: Flow exchanged between the unit {electronic piloting system+engine} and the water, Flux_BCB: Flow exchanged between the battery charger and the water, Flux_Rad: Flow exchanged between the radiator and the outside air, Temp_Ext: Air temperature outside the vehicle, measured by the passenger compartment processor.

The output from block C4 is TF_MDL, the water temperature generated by the internal model.

Block C4 is the embodiment of the equation (eq 3).

It should be noted that the parameters in blocks C1 to C4 are parameters having a physical meaning.

Figure 14:
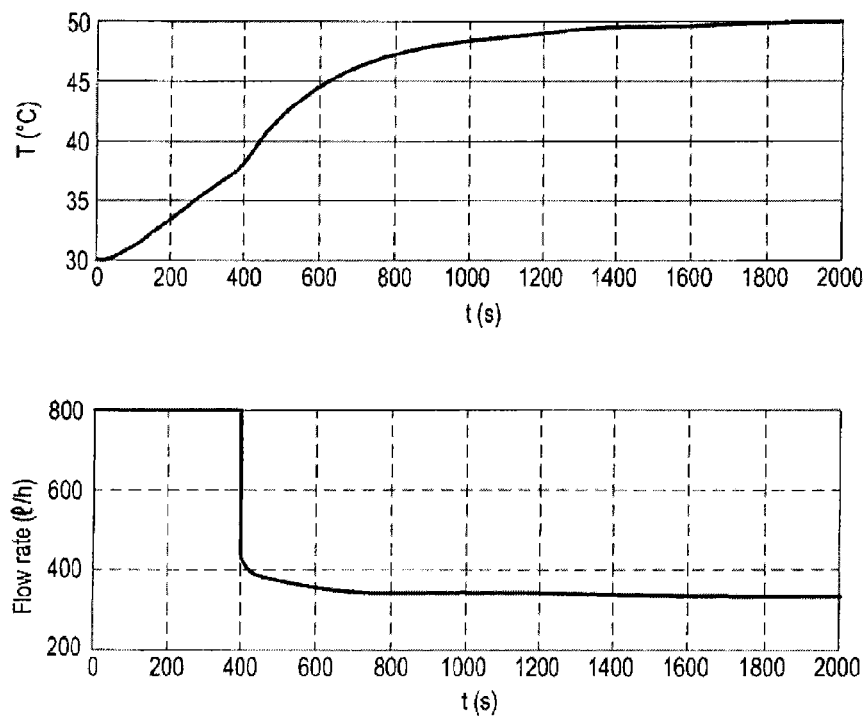

FIG. 14 shows the development of the temperature of the water and of the water flow rate as a function of time, obtained using the device according to the invention. The test conditions are identical to those described for FIGS. 2 and 3.

It can be seen that the intended objective is achieved: from the beginning of the test, the corrector is able to predict that the flow rate required to obtain a water temperature of 50° C. is a high flow rate (the command is saturated at the maximum flow rate of 800 l/h). Subsequently, when the losses to be dissipated are dropping, the corrector rapidly readjusts the flow rate command to the required value. The water temperature therefore remains below 50° C. throughout the test.

Figure 15:
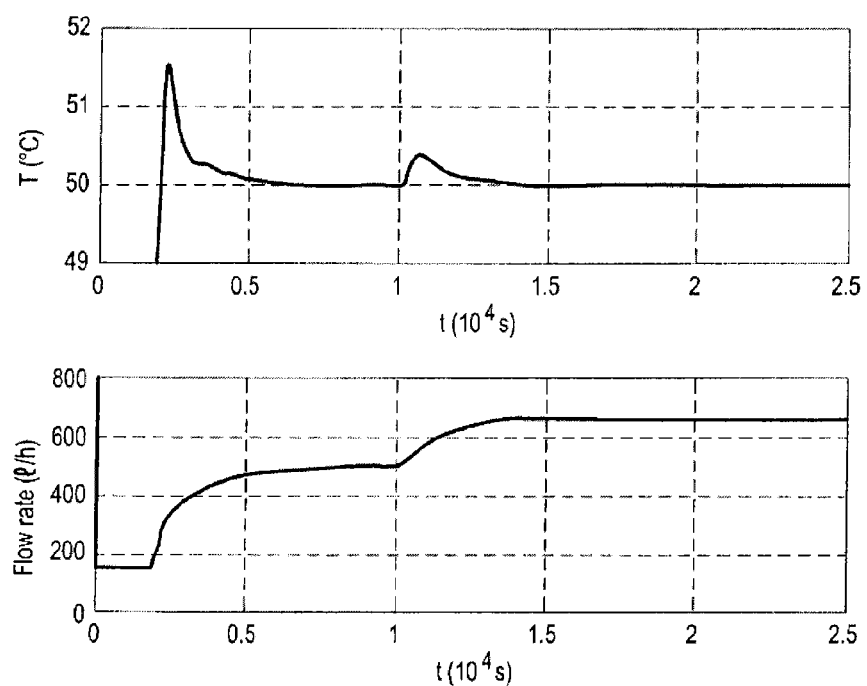
Figure 16:
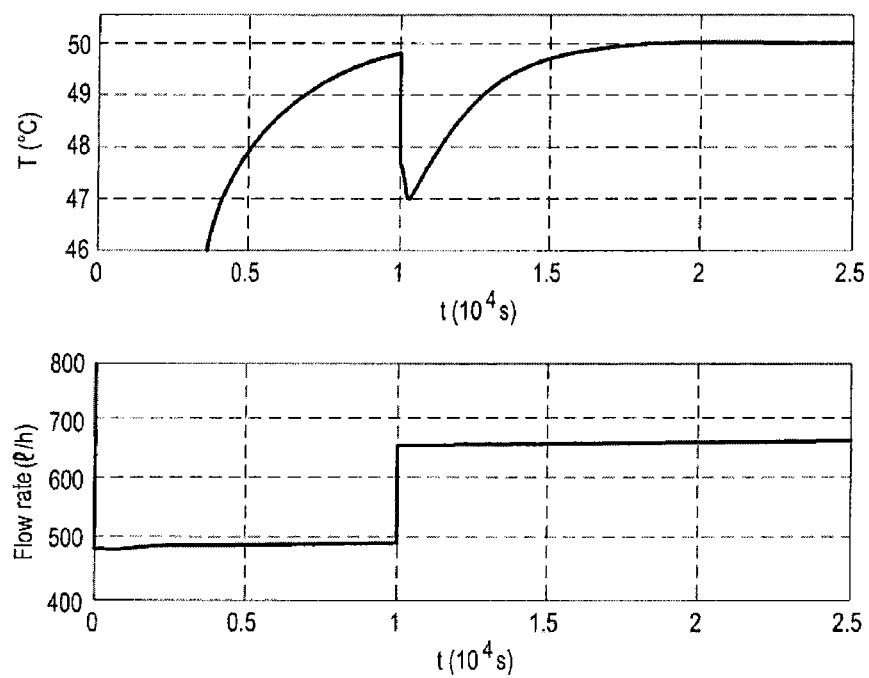

A second test showing the correct operation of the invention is shown in FIGS. 15 and 16.

The conditions of this test are as follows. Firstly, losses of 1500 W are injected. The vehicle speed is set at 30 km/h, with an outside temperature of 30° C.

At t=10000, losses of 2000 W are injected.

FIG. 15 illustrates operation of the PI corrector. The corrector does not change the flow rate, unless the water temperature exceeds the set point temperature of 50° C. As a result, the reaction occurs when the set point is passed.

As shown in FIG. 16, the corrector according to the invention immediately calculates, in a sampling period, the static flow rate required for cooling. It can be seen here that when the power step varies, the water flow rate is recalculated instantly, which prevents the set point from being exceeded, unlike the PI corrector.

The invention therefore makes the system safer. When a maximum set point temperature is set, the corrector ensures that the flow rate is commanded optimally so that this set point is not exceeded.

If the cooling requirement is too great to be met by simply increasing the flow rate, the electric fan unit is then activated to increase this cooling. With the internal-model corrector according to the invention, the electric fan unit is only activated if everything that could have been done using the flow rate command has been done.

The invention claimed is:

1. A cooling device for an electric vehicle, comprising:
a cooling circuit configured to cool an engine unit using a liquid coolant circulated by at least one variable flow rate pump, a flow rate of each pump being commanded by a command system,
wherein the engine unit includes an engine and an electronic piloting system to transform DC voltage from a battery of the electric vehicle into AC voltage to power the engine,
wherein the electric vehicle includes a battery charger separate from the engine unit and configured to recharge the battery of the electric vehicle from a domestic electricity network, and the cooling circuit is configured to selectively cool the battery charger and the engine unit, and
wherein the command system is configured to adjust the flow rate of each pump so that a temperature of the liquid coolant does not exceed a fixed set point temperature.

2. The device as claimed in claim 1, herein the command system is configured to adjust the flow rate of each pump at all times so that the temperature of the liquid coolant does not exceed the fixed set point temperature.

3. The device as claimed in claim 1, wherein the command system is configured to establish a flow rate set point as a function of a variable set point temperature.

4. The device as claimed in claim 3, wherein the variable set point temperature is a function of the fixed set point temperature, the temperature of the liquid coolant, and a temperature of the liquid coolant estimated as a function of the flow rate set point.

5. The device as claimed in claim 4, wherein the variable set point temperature is equal to the difference between the temperature of the liquid coolant and the estimated temperature, subtracted from the fixed set point temperature.

6. The device as claimed in claim 1, wherein the command system is configured to establish the flow rate set point as a function of a variable set point temperature, a temperature outside the vehicle, a speed of the vehicle, thermal losses of the electronic piloting system, and thermal losses of the battery charger.

7. The device as claimed in claim 6, wherein the command system is configured to establish the estimated set point temperature as a function of a flow rate set point, the temperature outside the vehicle, the speed of the vehicle, the thermal losses of the electronic piloting system, and the thermal losses of the battery charger.

8. The device as claimed in claim 1, further comprising a first pump configured to supply liquid coolant selectively to the engine unit and a second pump configured to supply liquid coolant selectively to the battery charger.

9. The device as claimed in claim 1, further comprising a first valve configured to stop liquid coolant from entering the battery charger while the liquid coolant enters the engine unit and a second valve configured to stop liquid coolant from entering the engine unit while the liquid coolant enters the battery charger.

10. The device as claimed in claim 9, further comprising a hydraulic restriction enabling a minimum flow rate of liquid coolant to be maintained in the engine unit.

11. The device as claimed in claim 1, wherein the command system includes a processor connected to sensors in the cooling circuit and configured to adjust the flow rate of each pump.

* * * * *